(12) United States Patent
Karam et al.

(10) Patent No.: US 8,332,244 B1
(45) Date of Patent: Dec. 11, 2012

(54) DETERMINING PREMIUMS FOR LIFE INSURANCE POLICIES

(75) Inventors: Matthew D. Karam, San Antonio, TX (US); Michael A. Belko, Boerne, TX (US); Angela L. Fahrenthold, San Antonio, TX (US); Regina E. Hirner, San Antonio, TX (US); Kristin J. Kuhn, San Antonio, TX (US); Shawn T. Loftus, San Antonio, TX (US); Jiemin L. Math, Austin, TX (US); Jeremy S. May, San Antonio, TX (US); James G. Miranda, San Antonio, TX (US); Christopher C. Ogburn, Helotes, TX (US); Richard E. Wintheiser, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 13/104,718

(22) Filed: May 10, 2011

(51) Int. Cl.
*G06Q 50/00* (2006.01)
(52) U.S. Cl. .............................................. 705/4; 705/35
(58) Field of Classification Search ................ 705/4, 35
See application file for complete search history.

(56) References Cited

U.S. PATENT DOCUMENTS

| 7,840,471 | B2 | 11/2010 | Foti et al. | |
| 7,970,682 | B2* | 6/2011 | Roti et al. | 705/36 R |
| 2002/0103678 | A1 | 8/2002 | Burkhalter et al. | |
| 2002/0173995 | A1* | 11/2002 | Schiminovich | 705/4 |
| 2004/0128112 | A1 | 7/2004 | Mikytuck et al. | |
| 2006/0089860 | A1* | 4/2006 | Fitzmorris | 705/4 |
| 2006/0111949 | A1* | 5/2006 | Krasnerman | 705/4 |
| 2006/0122871 | A1 | 6/2006 | Cowley et al. | |
| 2006/0184442 | A1* | 8/2006 | Krasnerman et al. | 705/35 |
| 2007/0016500 | A1* | 1/2007 | Chatterji et al. | 705/35 |
| 2007/0136164 | A1 | 6/2007 | Roti et al. | |
| 2008/0195425 | A1* | 8/2008 | Haggerty et al. | 705/4 |
| 2008/0221934 | A1* | 9/2008 | Megdal et al. | 705/4 |
| 2008/0319900 | A1* | 12/2008 | Schiminovich | 705/40 |
| 2009/0119133 | A1* | 5/2009 | Yeransian et al. | 705/4 |
| 2010/0094665 | A1* | 4/2010 | Schiminovich | 705/4 |

OTHER PUBLICATIONS

"Generalized Linear Models in Life Insurance: Decrements and Risk Factor Analysis Under Solvency II" [Retrieved on Feb. 23, 2011], Retrieved from the Internet <URL: http://www.actuaries.org/AFIR/Colloquia/Rome2/Cerchiara_Edwards_Gambini.pdf>.

\* cited by examiner

*Primary Examiner* — Jagdish Patel
*Assistant Examiner* — Sara C Hamilton
(74) *Attorney, Agent, or Firm* — Brooks, Cameron & Huebsch, PLLC

(57) ABSTRACT

The present disclosure describes determining a premium for a life insurance policy. One or more methods and systems include combining a determination of a mortality risk with a determination of a future lapse risk for an individual to yield the premium for the life insurance policy.

17 Claims, 3 Drawing Sheets

360 — COMBINING A DETERMINATION OF A MORTALITY RISK WITH A DETERMINATION OF A FUTURE LAPSE RISK FOR AN INDIVIDUAL TO YIELD A PREMIUM FOR A LIFE INSURANCE POLICY

370 — DETERMINING THE PREMIUM FOR THE LIFE INSURANCE POLICY INCLUDES THE DETERMINING BEING PERFORMED BY AN INSURANCE PROVIDER AND THE INDIVIDUAL BEING A POTENTIAL LIFE INSURANCE POLICY HOLDER

DETERMINING PREMIUMS FOR LIFE INSURANCE POLICIES

BACKGROUND

Often when an insurance provider offers life insurance to an individual (e.g., a potential life insurance policy holder), a number of underwriters first perform time consuming tasks of analyzing a breadth of information to determine a mortality risk for the individual that is associated with a risk for the insurance provider providing the life insurance product to the individual. For instance, an underwriter may need to collect health-, age-, and lifestyle-related data from a variety of sub-providers, in addition to data collected from the individual, and then analyze the collected data.

As such, the mortality risk for the individual may be based largely on the analysis of the collected health-, age-, and lifestyle-related data and resultant calculation of the mortality risk. Moreover, this mortality risk may serve as the principal parameter upon which the insurance provider bases determination of a premium (e.g., weekly, bi-weekly, monthly, quarterly, or yearly payments, etc.) for the individual to pay for life insurance policy.

However, there may be other risk factors for insurance providers that are not included in the mortality risk for the individual. Accordingly, it would be desirable to provide an improved model for determining a risk for the insurance provider associated with providing life insurance to the individual.

DETAILED DESCRIPTION

Figure 1:
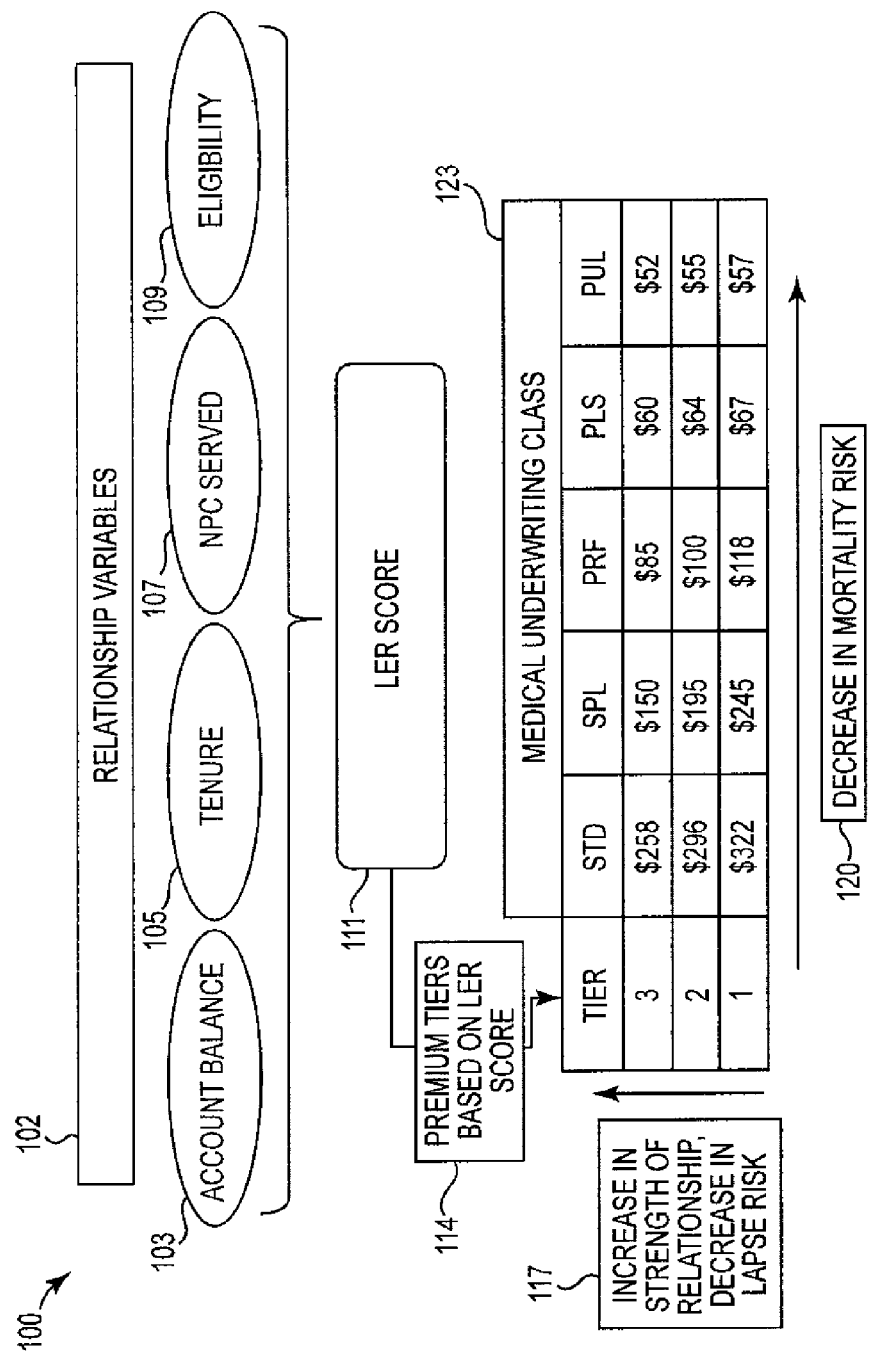
FIG. 1 illustrates a model for determining premiums for life insurance policies in accordance with one or more embodiments of the present disclosure.

An insurance provider may provide various types of insurance for an individual. The types of insurance may include life, health (e.g., medical, dental, etc.), property and casualty (P&C) (e.g., homeowners, renters, condominium, motor vehicle (e.g., automobile, motorcycle, motorhome, etc.), fire, valuable personal property, etc.), among other types of insurance. In some instances, the insurance provider may be associated with (e.g., as a subdivision of a larger corporate entity, as a result of a merger, etc.) a financial institution. The financial institution may provide various types of accounts in which an individual is able to deposit funds (e.g., cash, checks, automated deposits, etc.). The types of accounts may include savings, checking, certificate of deposit (CD), trust, among other types of accounts.

Analysis shows that, for instance, an individual who becomes an actual life insurance policy holder (e.g., a customer) is statistically less likely to let an existing policy lapse (e.g., for lack of timely payment of one or more premiums) than an average lapse rate for all life insurance policy holders when the individual has an established (e.g., pre-existing and ongoing for a period of time) relationship with the insurance provider and/or a financial institution associated with the insurance provider. As such, the relationship with the insurance provider and/or the financial institution can be used as a factor in determining a future lapse risk for the individual when determining the risk for the insurance provider associated with providing the life insurance to the individual (e.g., a financial risk for incurring the costs of underwriting the life insurance policy without recouping such costs via payment of the policy premiums that continues over a period of time, among other financial risks).

For example, a higher premium paid by the individual can at least partially compensate for a high future lapse risk relative to the average rate for all life insurance policy holders, while a lower premium can be a benefit for an individual having a low future lapse risk. Hence, the future lapse risk for the individual, which may be based at least in part on the individual's relationship with the insurance provider and/or the financial institution, can be used as a factor in determining a particular premium paid by the individual for the life insurance policy.

Accordingly, the present disclosure describes a number of embodiments for determining premiums for life insurance policies, at least in part, by combining a determination of a mortality risk with a determination of the future lapse risk for the individual to yield the premium for the life insurance policy. Determining the premium for the life insurance policy can, in some situations, be performed by the insurance provider when the individual is a potential life insurance policy holder.

In the following description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure. However, it is to be understood that other embodiments may be utilized and that process and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense. As used herein, "a" or "a number of" used in referring to a particular thing is intended refer to one or more such things. For example, "a number of databases" can refer to one or more databases.

Determination of a mortality risk class, as detailed elsewhere herein, may utilize documented variables determined for any combination of risk categories and/or risk factors, among other parameters, possibly using mortality risk determination rules. The mortality risk determination rules may include information gathered from a public database, a governmental database, a number of sub-providers, a re-insurer, one or more databases of the insurance provider, and/or other sources. The mortality risk determination rules may be periodically updated by the insurance provider. However, the ultimate determination of a mortality risk class may be accomplished with, at least, review by an underwriter.

Providing life insurance policies to each of a number of individuals often involves an assessment of a risk associated with the offering of the life insurance policy to each individual. The assessment of the risk associated with providing the life insurance policy is specific to each individual to whom the life insurance policy is to be offered and/or provided. The risk associated with the life insurance policy includes the risk of a customer's premature death due to illness or accident, as detailed herein with regard to assessment of the mortality risk. The analysis of such data is often difficult for an insurance provider to obtain in a cost effective and efficient manner.

For instance, an underwriter may have data that is collected from a variety of sub-providers and then perform analysis of the collected data. The data collected is often in disparate forms. This may involve an underwriter switching from one application to another, or even switching from one medium to another, to review the collected data. Thus, there may exist a time consuming and cumbersome review process. Additionally, in reviewing the data associated with providing the life insurance policy, a designee of the insurance provider, such as the underwriter, may apply his or her subjective reasoning in a determination of the risk associated with providing the life insurance policy. Thus, an individual (e.g., a potential life insurance policy holder) may have different experiences, including quotation rates, depending on the designee of the insurance provider assigned to his or her application. Furthermore, the insurance provider may incur costs in attempts to remedy the disparate effects of such subjective reasoning.

Moreover, an evaluation of total risk is valuable in understanding actual and potential costs to the insurance provider in offering and providing the life insurance policy. Such an evaluation may also be valuable to determine a cost that will be apportioned to the individual, for instance, in the form of premiums and/or terms and conditions associated with the life insurance policy.

However, there are other risk factors for insurance providers that are not included in the mortality risk for the individual. Accordingly, it would be desirable to provide an improved model for determining a more inclusive risk for the insurance provider associated with providing life insurance to the individual.

FIG. 1 illustrates a model 100 for determining premiums for life insurance policies in accordance with one or more embodiments of the present disclosure. Premiums for life insurance policies offered to individuals usually do not take into account the individuals', or the individuals' family members' and/or associates', previously and currently existing (e.g., pre-existing and/or ongoing) relationships with the insurance provider and/or a financial institution associated with the insurance provider.

In contrast, as described in the present disclosure, a Life Enterprise Relationship (LER) can yield a prediction of a future lapse risk for each individual (e.g., each potential life insurance policy holder) by analyzing that individual's relationship variables 102. The relationship variables 102 pertain to the individual's, or the individuals' family members' and/or associates', previously and currently existing relationship with the insurance provider and/or a financial institution associated with the insurance.

The relationship variables 102 can be analyzed to yield a number of yes/no determinants for being eligible for being offered a life insurance policy. Alternatively or in addition, the relationship variables can be analyzed to yield a number of numerical variables that define a relationship (e.g., a strength of the relationship) between the individual and the insurance provider and/or a financial institution associated with the insurance provider.

For example, in one or more embodiments, the relationship variables 102 can include an account balance 103 in one or more previously and/or currently existing types of accounts in which an individual is able to deposit funds (e.g., cash, checks, automated deposits, etc.) at a financial institution. The types of accounts may include savings, checking, certificate of deposit, trust, among other types of accounts. The records of the account balance(s) 103 can be analyzed to yield a yes/no determinant for being eligible for being offered a life insurance policy and/or the account balance(s) 103 can be analyzed to yield a numerical variable that defines the relationship (e.g., the strength of the relationship) between the individual and the insurance provider and/or a financial institution associated with the insurance provider.

An individual with a high account balance has been determined to have a low future lapse risk compared to other individuals with lower account balances. This correlation is believed to result from individuals with high account balances being more committed to maintaining a good relationship with their financial institution to prevent incurring penalties (e.g., lowered interest rates on interest-bearing accounts resulting from overdrafts, late payments or defaults on loans, etc.) because these penalties would have a larger monetary effect on a larger balance total than on a smaller balance total. Such a strong relationship with the financial institution associated with the insurance provider is predictive of maintaining a good relationship with the insurance provider to prevent a potential future lapse of insurance policies (e.g., a life insurance policy) by reliably paying associated premiums.

The relationship variables 102 also can include a tenure 105 (i.e., length of time) that the individual, the family member(s), and/or the associate(s) has had a relationship with the insurance provider (e.g., tenures for owning each individual pre-existing and/or ongoing insurance policy, a cumulative tenure of each owner of multiple insurance policies, and including information regarding lapses of same). In addition, the tenure 105 can include a length of time that the individual, the family member(s), and/or the associate(s) has had a relationship with one or more of the associated financial institutions (e.g., tenures for owning each individual closed and/or ongoing account and/or a cumulative tenure of each owner of multiple accounts, and including information regarding voluntary and forced closures of same). In some embodiments, the tenure 105 can be determined by a cumulative tenure of P&C policies for an individual's household (e.g., the household including the individual and the individual's family members). The records of the tenure(s) 105 can be analyzed to yield a yes/no determinant for being eligible for being offered a life insurance policy and/or the tenure(s) 105 can be analyzed to yield a numerical variable that defines the relationship (e.g., the strength of the relationship) between the individual and the insurance provider and/or a financial institution associated with the insurance provider.

In addition, the relationship variables 102 can include information regarding non-payment communications 107 (NPC) served on the individual with regard to charges for late premium payments, notice of policy lapses/cancellations, and/or collection agency and/or legal proceedings concerning same, etc. The NPC 107 also can include information regarding NPC(s) served on the individual with regard to charges for check overdrafts, credit card delinquencies, late loan payments, loan defaults, and/or collection agency and/or legal proceedings concerning same, etc. The records of the NPC(s) served 107 can be analyzed to yield a yes/no determinant for being eligible for being offered a life insurance policy and/or the NPC(s) served 107 can be analyzed to yield a numerical variable that defines the relationship (e.g., the strength of the relationship) between the individual and the insurance provider and/or a financial institution associated with the insurance provider.

Moreover, the relationship variables 102 can include a determination of eligibility 109 of the individual for life insurance provided by the insurance provider. As utilized in the present disclosure in one or more embodiments, eligibility can be determined by the eligibility of the individual for P&C insurance coverage by the insurance provider. By way of example and not by way of limitation, such eligibility can be determined by criteria such as the individual being a member of a previously selected group of individuals (e.g., current or former members of the military services) or a family member (e.g., husband, wife, father, mother, child, among other family members) of the member of the previously selected group of individuals or an associate (e.g., ex-spouse(s), ex-dependent(s), among others not currently considered family members) who has become eligible for P&C coverage by being associated during a particular time period with the member of the previously selected group of individuals. Records determining the eligibility 109 of the individual can be analyzed to yield a yes/no determinant for being eligible for being offered a life insurance policy and/or the records determining the eligibility 109 of the individual can be analyzed to yield a numerical variable that defines the relationship (e.g., the strength of the relationship) between the individual and the insurance provider and/or a financial institution associated with the insurance provider.

An LER model can be constructed. The LER model can take into account an individual's relationship with the insurance provider and/or a financial institution associated with the insurance provider by analyzing the tenure, eligibility, payments patterns, and/or assets under management of the insurance provider and/or a financial institution associated with the insurance provider. When the relationship variables 102 (e.g., account balance 103, tenure 105, NPC Served 107, and/or Eligibility 109) yield a number of numerical variables that individually contribute to defining the strength of the relationship between the individual and the insurance provider and/or a financial institution associated with the insurance, the relationship variables 102 can be combined to yield a LER score 111.

The LER score can, in one or more embodiments, be calculated using the numerical variables just described. By way of example and not by way of limitation, an LER score for a particular individual can be calculated (e.g., using an equation) by taking the individual's tenure 105 (e.g., where the tenure can include one or more of the tenure(s) of the individual's accounts at the associated financial institution, the tenure of the individual's other pre-existing and/or ongoing life insurance policies, and/or the tenure of the individual's pre-existing and/or ongoing P&C household policies, among other types and combinations of tenure) multiplied by a first constant (e.g., determined by statistical analysis) to yield a first total raw score or a first partial raw score.

In one or more embodiments, the individual's account balance 103 (e.g., in interest-bearing accounts) multiplied by a second constant (e.g., determined by statistical analysis) can be added to the first partial raw score to yield a second total raw score or a second partial raw score.

In one or more embodiments, the number of NPC(s) served 107 multiplied by a third constant (e.g., determined by statistical analysis) can be added to the first or second partial raw score to yield a third total raw score or a third partial raw score. In one or more embodiments, the eligibility 109, which may be limited to values of 0 and 1 based upon whether the individual satisfies the eligibility criteria, is multiplied by a fourth constant (e.g., determined by statistical analysis) and can be added to the first, second, or third partial raw scores to yield a fourth total raw score.

In one or more embodiments, the eligibility 109 can be used as a yes/no determinant for the individual's eligibility for being offered a life insurance policy by the insurance provider. That is, for example, if the individual, family members, and/or associates have no pre-existing and/or ongoing relationships that make them eligible for P&C insurance coverage by the insurance provider, the individual is not eligible for being offered the life insurance policy by the insurance provider.

In one or more embodiments, raw scores can be multiplied by one or more scaling factors (e.g., determined by statistical analysis) to yield LER scores with numerical values that can be easily compared by a person (e.g., an insurance analyst) or used by a program in a computing device that has performed the preceding calculations. In some embodiments, an individual with a higher LER score is determined to have a lower future risk for lapse of a life insurance policy than an individual with a lower LER score (e.g., determined by statistical analysis).

By way of example and not by way of limitation, an individual with an LER score of 1.0 or lower may have at least a 50% probability (e.g., determined by statistical analysis) of a future lapse of an insurance policy, whereas an individual with an LER score of 3.0 or more may have a probability approaching 0% (e.g., determined by statistical analysis) of a future lapse of an insurance policy. In this example, an individual with an LER score of around 2.0 may have a probability of around 10% (e.g., determined by statistical analysis) of a future lapse of an insurance policy.

As such, comparison (e.g., ranking) of LER scores 111 can predict likelihood of future life insurance policy lapses. Analysis shows that, for instance, an individual who becomes an actual life insurance policy holder (e.g., a customer) is statistically less likely to let an existing policy lapse (e.g., for lack of timely payment of one or more premiums) than an average lapse rate for all life insurance policy holders when the individual has an established (e.g., pre-existing and ongoing for a period of time) relationship with the insurance provider and/or a financial institution associated with the insurance provider.

Hence, the future lapse risk for the individual, as determined by a particular LER score 111, can be used as a factor in determining a particular premium paid by the individual for the life insurance policy. Various levels of LER scores 111 can be used to form premium tiers based on the LER score 114. The various levels of LER scores can be used to assign the individual to one of various tiers (arbitrarily numbered 1, 2, and 3 in FIG. 1, although more or less tiers with different numbers or other indicators may be used). For illustration, the increasing tier numbers in FIG. 1 correspond to an increase in the strength of the relationship, that is, a decrease in the future lapse risk 117 for the individual.

As illustrated in the model 100 for determining premiums for life insurance policies shown in FIG. 1, the tiers represent the decrease in future lapse risk (i.e., the increase in the strength of the relationship) on a vertical axis of a table and a decrease in mortality risk 120 on a horizontal axis of the table. However, the table is shown by way of example and not by way of limitation. As will be appreciated, various computer programs can manipulate data in such models in various manners without deviating from the concept of the present disclosure.

The decrease in mortality risk 120 on the horizontal axis of the table can be separated into a number of levels corresponding to the decrease in mortality risk. For example, mortality risk categories and factors, as described elsewhere herein, may be used in assessment of a mortality level for the individual. A range of mortality risk levels can be determined for a representative demographic cross-section of individuals. A particular segment of that range of mortality risk levels can be assigned to a medical underwriting class 123. The medical underwriting classes may cover the range of mortality risk levels determined for the representative demographic cross-section of individuals. By way of example and not by way of limitation, representative segments of the range of mortality risk levels (i.e., medical underwriting classes) can by labeled, in order of decrease in mortality risk 120, standard (STD), standard plus (SPL), preferred (PRF), preferred plus (PLS), and preferred ultra (PUL).

As shown in the table, an individual with an LER score that assigns that individual to tier 1 (i.e., having a relatively low strength of relationship and a relatively high lapse risk) and an assignment to the STD medical underwriting class (i.e., having a relatively high mortality risk) is assigned the highest premium cost (e.g., $322) for the life insurance policy. By comparison, an individual being assigned to the same STD medical underwriting class (i.e., having a relatively high mortality risk), but with an LER score that assigns that individual to tier 3 (e.g., having a relatively high strength of relationship and a relatively low lapse risk), has a markedly lower assigned premium cost (e.g., $248, or approximately 23% lower than $322). An individual with an LER score that assigns that individual to tier 2 (i.e., having a relatively intermediate strength of relationship and a relatively intermediate lapse risk) and an assignment to the STD medical underwriting class is assigned a premium cost (e.g., $296) that is between the cost for tier 1 (e.g., $322) and tier 3 (e.g., 258). Similar decreases in premiums for the other medical underwriting classes are shown in the table based on a particular individual having an LER score that assigns that individual to higher tier versus a lower tier.

The particular premium amounts shown in the table, and the differences in the premium amounts between the various tiers, are shown by way of example and not by way of limitation. In addition, the particular premium amounts shown in the table are not intended to represent actual premium amounts charged to individuals (e.g., weekly, bi-weekly, monthly, quarterly, or yearly payments, etc.) for life insurance policies.

Figure 2:
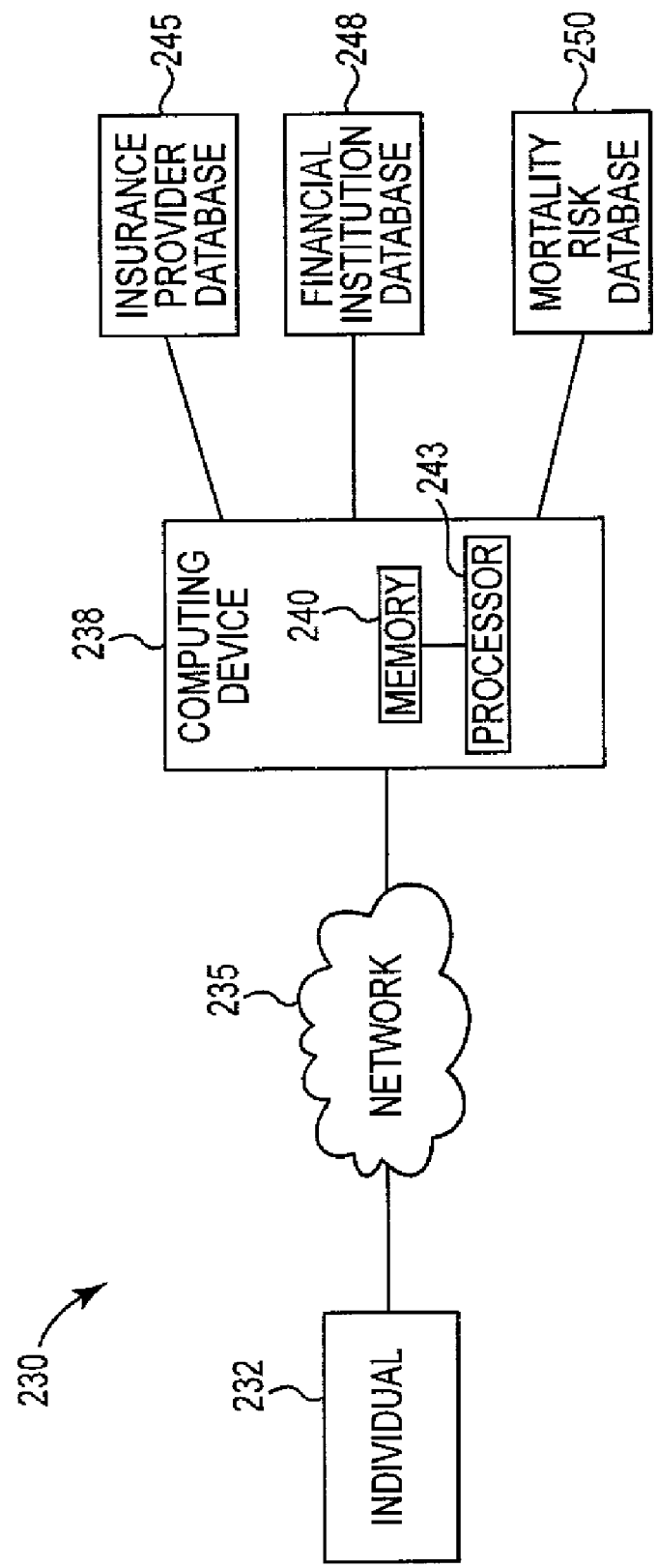
FIG. 2 illustrates a system for determining premiums for life insurance policies in accordance with one or more embodiments of the present disclosure.

FIG. 2 illustrates a system for determining premiums for life insurance policies in accordance with one or more embodiments of the present disclosure. As shown in FIG. 2, system 230 includes an individual 232 (e.g., a potential policy holder, an existing customer, a representative of the individual, etc.) and a device (not shown) associated with individual 232 operably coupled to (e.g., in communication with) a network 235 to link with a computing device 238 via the network 235. As an example, the device associated with individual 232 can be a mobile device (e.g., a mobile phone, a personal digital assistant (PDA), etc.), a laptop computer, a desktop computer, or a landline telephone, among other types of communication devices. Although not shown in FIG. 2, the device associated with individual 232 can communicate with computing device 238 via a public switched telephone network (PSTN).

Network 235, can, for example, be a wide area network (WAN) such as the Internet, a local area network (LAN), a personal area network (PAN), a campus area network (CAN), or metropolitan area network (MAN), among other types of networks. As used herein, a "network" (e.g., network 235) can provide a communication system that directly or indirectly links two or more computers and/or peripheral devices to allow users to access resources on other computing devices and exchange messages with other users. A network can allow users to share resources on their own systems with other network users and to access information on centrally located systems or on systems that are located at remote locations.

A network (e.g., network 235) may provide connections to the Internet and/or to the networks of other entities (e.g., organizations, institutions, etc.). Users (e.g., individual 232) may interact with network-enabled software applications to exchange information (e.g., view, download, and/or print a file, upload information, request and/or receive a quote for a life insurance premium, among other types of information exchange). The network (e.g., network 235) and/or the users (e.g., individual 232) may also communicate with network management software (e.g., applications, etc.), which can interact with network hardware to transmit information between devices on the network.

As shown in FIG. 2, system 230 also includes the computing device 238. Computing device 238 can include a memory 240, and a processor 243 operably coupled to memory 240. Computing device 238 can represent a computing device of a particular entity (e.g., of an insurance provider and/or a financial institution, among other possibilities connected to these entities) and/or a server shared by multiple entities.

Memory 240 can be any type of storage medium that can be accessed by a processor 243 to perform various embodiments of the present disclosure. For example, memory can be a non-transitory computer-readable medium having computer-readable instructions (e.g., computer program instructions) stored thereon that are executable by a number of processors to perform the various embodiments of the present disclosure.

Memory 240 can be volatile or nonvolatile memory. Memory 240 can also be removable (e.g., portable) memory or non-removable (e.g., internal) memory. For example, memory 240 can be random access memory (RAM), read-only memory (ROM), dynamic random access memory (DRAM), electrically erasable programmable read-only memory (EEPROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory 240 is illustrated as being located in computing device 238, embodiments of the present disclosure are not so limited. For example, memory 240 can also be located internal to another computing resource (e.g., enabling the computer-readable instructions to be downloaded over the Internet or another wireless connection or a wired connection, such as a bus).

As shown in FIG. 2, system 230 also includes a number of databases 245, 248, 250 operably coupled to (e.g., in communication with) computing device 238. Databases can include (e.g., store) information about a number of individuals. For example, a database of one or more insurance providers 245 can be used to store information about potential and existing policy holders (e.g., customers), a database for one or more financial institutions 248 can be used to store information about account holders (e.g., customers), and a database of, or separate from and accessible by, the insurance provider 250 can be used to store information usable to enable determination of a mortality risk, such as for individual 232 illustrated in FIG. 2. Each of the databases 245, 248, 250 can be external or internal to the computing device 238 and can store information different from or overlapping with that of each of the other databases. Each of the databases 245, 248, 250 can represent more than one database and the system 230 can also include a number of databases not shown in FIG. 2.

One or more of the databases 245, 248, 250 can include, for example, demographical information about the individuals, such as the ages, addresses, and/or family status (e.g., married, single, children) of the individuals, among other demographical information (e.g., insurance policies and/or financial accounts previously and/or currently held by or covering family members and/or associates). The information can also include financial information about the individuals, such as information about the bank account(s) (e.g., separate and/or total amounts of money in the individuals' savings and/or checking accounts, CDs, trusts, among others) and/or a loan (s), such as a mortgage, vehicle loan, personal loan, etc. (e.g., terms, timeliness of payment, etc.) of the individuals, among other financial (e.g., banking) information.

The information also can include insurance information about the individuals, such as the insurance policy type(s) (e.g., P&C, health, life, etc.), terms (e.g., cost, duration, etc.), and/or reliability (e.g., timeliness of payment, past lapses, etc.) of the individuals, among other insurance information. Such information can include a length of time (i.e., tenure) that the individual, the family member(s), and/or the associate (s) has had a relationship with the insurance provider (e.g., tenures for owning each individual pre-existing and/or ongoing insurance policy, a cumulative tenure of each owner of multiple insurance policies, and including information regarding lapses of same). Such information also can include information regarding NPC(s) served on the individual (e.g., with regard to charges for late premium payments, notice of policy lapses/cancellations, and/or collection agency and/or legal proceedings concerning same, etc.).

Such information can further include a length of time (i.e., tenure) that the individual, the family member(s), and/or the associate(s) has had a relationship with the financial institutions (e.g., tenures for owning each individual pre-existing and/or ongoing account and/or a cumulative tenure of each owner of multiple accounts, and including information regarding voluntary and forced closures of same). Such information also can include information regarding NPC(s) served on the individual (e.g., with regard to charges for check overdrafts, credit card delinquencies, late loan payments, loan defaults, and/or collection agency and/or legal proceedings concerning same, etc.). The information can also include credit information about the individuals, such as the credit score(s) of the individuals, among other credit information.

In one or more embodiments, the information can include other financial information about the individuals (e.g., income, debt information, etc.). The information also can include data associated with the homes of the individuals, such as Marshall-Swiftback housing data (e.g., the date a house was built, the address of the house, the type of house, and/or the materials used to build the house), among other housing data.

In one or more embodiments of the present disclosure, each database 245, 248, 250 can include one particular type of information about the individuals. For example, a first database (e.g., 245) can include the information about potential and existing insurance policy holders, a second database (e.g., 248) can include the information about financial institution account holders, a third database (e.g., 250) can include the information usable to enable determination of individuals' mortality risks. Additionally and/or alternatively, each database 245, 248, 250 can include multiple types of information about the individuals. Additionally and/or alternatively, a single database can include all the information about the individuals.

The information in databases 245, 248, 250 can be obtained during one or more previous transactions (information exchanges, financial and/or insurance arrangements, etc.) with the individuals. The previous transactions can include, for example, mortgage applications, such as a home mortgage application, a line of credit application, a credit card application, a deposit account application, or other types of applications that may have been filed by or on behalf of the individuals, family members, and/or associates. In addition, the information in databases 245, 248, 250 can include, for example, credit information obtained during a previous application process.

The previous transactions can also include, for example, purchases of and/or premium payment histories for insurance policies, such as P&C, life, health, umbrella, mortgage and/or mortgage life insurance policies, among other types of insurance policies. However, embodiments of the present disclosure are not limited to a particular type of transaction.

The reader will appreciate that a determination of a mortality risk can be obtained by various methods and/or systems, including those described in co-pending U.S. patent application Ser. No. 11/831,386, entitled, "System and Method to Determine Risk Associated with Providing a Financial Product", filed on Jul. 31, 2007, and having the same Assignee, the contents of which are incorporated by reference in their entirety herein. Hence, although an abbreviated description consistent with that recited in the incorporated reference is provided herein, the fuller details are incorporated by reference.

With regard to the one or more mortality risk databases 250 shown in FIG. 2, a provider of the information to be stored therein can be operably coupled to the network 235 or otherwise directly or indirectly connected to provide such information. In some instances, a plurality of sub-providers are operably coupled to the network 235 or otherwise directly or indirectly connected in order to allow communication between the sub-providers and the one or more mortality risk databases 250 of the insurance provider. For instance, the sub-providers are providers of services and/or information to the insurance provider. One or more individuals (e.g., individual 232) may also be operably coupled to the network 235 such that communication is allowed between the provider of information and/or a sub-provider and the individual 232. The sub-providers may collect data associated with the individual 232. The sub-providers may generate or produce the data. The sub-providers may collect data from various other sources. The sub-providers may include providers such as, for example, a medical or other type of laboratory, a motor vehicle record provider, a medical services provider (e.g. a "telemed" vendor), a medical information bureau (MIB), paramedical service provider, a governmental agency such as a social security administration, and/or a variety of other sub-providers known in the art.

Each of the insurance provider, the individuals, and the sub-providers includes a respective network interface for communicating with networks (e.g., network 235) for outputting information to, and receiving information through, the networks, such as by transferring information (e.g., instructions, data, signals) between such parties and the networks. Accordingly, for example, through the network, the insurance provider communicates with the individuals, and the individuals communicate with the insurance provider. Also, for example, through the network, the insurance provider communicates with the sub-providers, and the sub-providers communicate with the insurance providers. In a further example, through the network, the sub-providers communicate with the individuals and the individuals communicate with the sub-providers. The system 230 shown in FIG. 2 may include any number of sub-providers directly or indirectly in communication with any number of mortality risk databases, computing devices, and/or individuals through any number of networks. In the discussion below, the sub-provider is representative of one or more of the sub-providers.

In one or more embodiments of the present disclosure, the mortality risk information database 250 may include a plurality of mortality risk determination rules (e.g., business rules), categorical assignments of risk levels used by the mortality risk determination rules, and/or other data associated with determining a mortality risk of providing a life insurance policy. The mortality risk information database 250 may be a publicly available database or a private database that is available to be accessed by the insurance provider. The mortality risk information database 250 may include a listing of available sub-providers, forms (e.g., questionnaires) for completion by the sub-providers, information specific to one or more sub-provider (e.g., operating procedures), and/or a variety of other information.

Determining a mortality risk for an individual may begin when a request from the individual, or a representative of the individual, for a potential life insurance policy is received. The individual and the insurance provider may communicate in person, by telephone, through a network (e.g., network 235), and/or in a variety of other manners known in the art.

Personal information may be collected from the individual 232. The personal information may be collected from the individual 232 by the insurance provider via the network 235 for immediate use by the computing device 238, for storage in the insurance provider database 245, and/or for storage in the mortality risk database 250. In one or more embodiments, the personal information may include information associated with the individual 232, such as, for example, a name, an age, an occupation, an employer, a family composition, a driver's license number, contact information, information on other insurance policies acquired and/or attempted to be acquired by the individual 232, and/or other personal information known in the art. The individual 232 may provide beneficiary information for a life insurance policy. In one or more embodiments, the individual 232 may provide, for example, information associated with past, present, and future practices associated with tobacco use, aviation practices, travel (e.g., including destination countries and length of travel time), receipt of workman's compensation, suspensions of driver's license, driving history, avocations including participation in dangerous activities such as piloting, skydiving, rock climbing, or vehicle racing, felony or other convictions, and/or a variety of other information. In one or more embodiments, one or more of the above information types may be collected by the sub-provider, such as described below. In one or more embodiments, one or more pieces of the personal information may be acquired from information previously stored in the databases 245, 248, 250.

Determining the mortality risk for the individual 232 may further include components such as, for example, a human immunodeficiency virus (HIV) testing consent form, HIV testing results, a medical information bureau (MIB) search result, collection of a blood sample, a blood profile of the collected sample, physical measurements of the individual, a "telemed" report, a driving (e.g., motor vehicle) record, collection of a urine specimen, a urine specimen analysis, and/or other requirements known in the art. The data set may be determined by a risk class determination engine (not shown). The risk class determination engine may be in communication with (e.g., operably coupled to) the mortality risk information database 250, where the mortality risk information database 250 or the risk class determination engine may provide one or more mortality risk determination rules.

The determination of the components required, and specific parameters of said components required, may be based upon input requirements for the mortality risk determination rules. An MIB search result may include, for instance, results from searching a database of information pooled from a plurality of providers associated with the individual's past insurance and/or financial product applications. A "telemed" report may include, for instance, aviation use, avocation, medical history, driving history, family history, history of unlawful acts, occupation, and/or tobacco use associated with the individual. The "telemed" report may further include information associated with the individual and may be obtained from a medical or paramedical exam such as height, weight, blood pressure, blood profile, urinalysis, and/or other information known in the art to be useful for risk assessment. The "telemed" report may be generated by the sub-provider in communication with and/or as a result of examination of the individual.

The blood profile may include tests such as cholesterol, blood alcohol level, prostate specific antigen (PSA), hemoglobin (HgB), HIV, carbohydrate-deficient form of transferrin (CDT), hepatitis, albumin, triglycerides, glucose, creatinine, alkaline phosphatase, globulin, fructosamine, blood urea nitrogen (BUN), bilirubin, aspartate aminotransferase (AST), alanine aminotransferase (ALT), gamma-glutamyl transferase (GGT), and/or other tests known in the art. The urinalysis may include tests such as those associated with glucose, proteins, white blood cell screen, red blood cell screen, creatinine, protein/creatinine ratio, cotinine, marijuana, methamphetamine, human chorionic gonadotropin (HCG), granular casts, myaline casts, red cell casts, specific gravity, urine temperature, adulterant tests, bilirubin, pH, illegal drugs, and/or other tests known in the art.

Each of the one or more mortality risk determination rules may include a plurality of risk categories associated with it, and likewise, each risk category may include a plurality of risk factors. The mortality risk categories may include, by way of example and not by way of limitation, categories for aviation, avocation, build, medical history, driving history, motor vehicle records, family history, occupation, foreign residence/travel, tobacco use, urinalysis, blood profile, blood pressure, and/or other applicable risk categories.

Examples of mortality risk categories and risk factors associate with the mortality risk categories include, by way of example and not by way of limitation, the following. A mortality risk category of tobacco use may include risk factors associated with the time of the use, frequency of use, type of tobacco used, elapsed time since the last use, and/or other applicable risk factors. A mortality risk category of foreign travel may include risk factors such as future travel planned including planned destination countries, planned duration of stay, purpose of travel, frequency of travel, and/or other applicable risk factors. A mortality risk category of medical history may include risk factors such as alcohol use, current or past medical conditions associated with blood disorders, muscular/skeletal conditions (e.g., arthritis, etc.), diabetes, cancer, digestive track conditions, reproductive health conditions, respiratory health conditions (e.g., asthma, pneumonia, sleep apnea, etc.), skin conditions, urinary disorders, heart/blood vessel disorders, mental health conditions (e.g., attention deficit disorder (ADD) or attention deficit hyperactivity disorder (ADHD), anxiety, depression, seizures, etc.), history of diagnostic tests performed (e.g., colonoscopy, computerized tomography (CT) scan, electrocardiogram (ECG), echocardiogram, exercise treadmill test, magnetic resonance imaging (MRI), x-rays, etc.), results of such diagnostic tests, history of visits to a physician, reason for such visits, and/or a variety of other applicable risk factors. A mortality risk category of motor vehicle records may include risk factors such as a record of driving while intoxicated/driving under the influence (DWI/DUI) convictions, a record of a suspended of licenses, the time of the violation, the severity of violation, and/or other applicable risk factors. A mortality risk category of aviation may include risk factors such as reason for travel by aircraft, type of aircraft (e.g., civilian, commercial, military, etc.), duration of flight, destination, type of commercial aircraft including proprietor, purpose of travel, qualifications of a customer using a personal aircraft (e.g., pilot training, hours logged, etc.), and/or other applicable risk factors. A mortality risk category of avocation may include risk factors such as the type of activity (e.g., rock climbing, mountain climbing, scuba diving, skydiving, etc.), time spent pursuing the avocation, experience level, severity of experience (e.g., depth of dive, rating of mountain, etc.), and/or other applicable risk factors. A mortality risk category of driving history may include risk factors such as convictions/violations including type, timing, severity, and quantity, and/or other applicable risk factors. A mortality risk category of family history may include risk factors such as parental cause of death, extended family member cause of death, history of medical conditions associated with a family member, family members' ages at death, and/or other applicable risk factors. A mortality risk category of build (e.g., physical characteristics, etc.) may include risk factors such as physical measurements of an individual such as height and weight, and/or other applicable risk factors.

Accordingly, as described in the present disclosure, a system for determining a premium for a life insurance policy can, in one or more embodiments, include one or more databases having information about an individual and a computing device coupled to the one or more databases that is configured to combine a determination of mortality risk with a determination of a future lapse risk for the individual to yield the premium for the life insurance policy. At least one tenure of a relationship between the individual and an insurance provider or a financial institution associated with the insurance provider can be used as at least one of a number of numerical variables to determine the future lapse risk.

The one or more databases can, in one or more embodiments, include a first database having information about the individual and the relationship with the insurance provider from which tenures of a number of insurance policies are determinable, a second database having information about the individual and the relationship with the financial institution associated with the insurance provider from which a tenure of the relationship is determinable, and a third database having information about the individual from which the determination of the mortality risk is determinable. The information in the first database can include information about the individual's previous and/or continuing (e.g., pre-existing and/or ongoing) life insurance, health, and/or P&C insurance policies, among others, and their associated premium payment histories. The information in the second database can include information about the individual's previous and continuing (e.g., pre-existing and/or ongoing) bank accounts and their associated payment histories, where this information can include information about the individual's present interest-bearing accounts, including the individual and cumulative balances.

The system can, in one or more embodiments include a computer-readable medium having computer-readable instructions stored thereon to determine the premium for the life insurance policy. The computer-readable instructions can be executable to combine a determination of a mortality risk with a determination of a future lapse risk for an individual to yield the premium for the life insurance policy.

The computer-readable instructions also can, in one or more embodiments, be executable to execute an equation having a number of numerical variables, where at least one tenure of the relationship between the individual and the insurance provider or a financial institution associated with the insurance provider is used as at least one of the number of numerical variables to determine a score for the future lapse risk. The score for the future lapse risk can, in one or more embodiments, determine a particular tier from among a plurality of tiers that define particular premiums for each of a plurality of mortality risk categories. A longer tenure of the relationship can contribute to a score indicative of a lower future lapse risk, at least in an absence of being counteracted by others among the number of numerical variables when the equation is executed, where the score indicative of the lower future lapse risk determines a lower premium than a base premium in each of a plurality of mortality risk categories.

The number of numerical variables can, in one or more embodiments, include the individual's balance in one or more interest-bearing accounts at the financial institution and/or a total of NPC(s) served to the individual by the insurance provider and/or the financial institution associated with the insurance provider. A larger balance in the one or more interest-bearing accounts and a lower total of the NPC(s) served each can contribute to a score indicative of a lower future lapse risk, where a score resulting from use of the number of numerical variables indicative of the lower future lapse risk can determine a lower premium than a base premium in each of a plurality of mortality risk categories. A determination of whether the individual or at least one family member and/or associate is eligible for P&C insurance coverage by the insurance provider can be used as an eligibility requirement.

Figure 3:
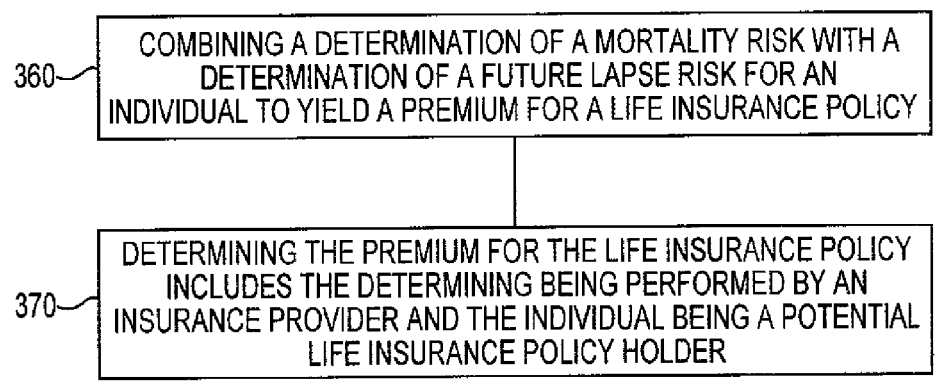
FIG. 3 is a block diagram that illustrates an example of a method for determining premiums for life insurance policies in accordance with one or more embodiments of the present disclosure.

FIG. 3 is a block diagram that illustrates an example of a method for determining premiums for life insurance policies in accordance with one or more embodiments of the present disclosure. Unless explicitly stated, the method embodiments described herein are not constrained to a particular order or sequence. Additionally, some of the described method embodiments, or elements thereof, can occur or be performed at the same, or substantially the same, point in time.

As shown in block 360 of FIG. 3, determining premiums for life insurance policies includes combining the determination of the mortality risk with the determination of the future lapse risk for the individual to yield the premium for the life insurance policy. Block 370 shows that determining the premium for the life insurance policy can include the determining being performed by the insurance provider with the individual being a potential life insurance policy holder.

In one or more embodiments, using a computer-readable medium having computer-readable instructions stored thereon can be executed for determining the premium for the life insurance policy. Combining the determination of the mortality risk with the determination of the future lapse risk for the individual can, in one or more embodiments, include determining a level of the future lapse risk using a number of numerical variables that define a relationship between the individual and the insurance provider.

Defining the relationship between the individual and the insurance provider can, in one or more embodiments, include defining a relationship between the individual and a financial institution associated with the insurance provider. Defining the relationship (e.g., the strength of the relationship) between the individual and the insurance provider and/or the financial institution associated with the insurance provider can, in one or more embodiments, include using: the individual's tenure in at least one insurance and/or financial relationship as one of the number of numerical variables; the individual's balance in one or more interest-bearing accounts at the financial institution as one of the number of numerical variables; a total of NPC(s) served to the individual as one of the number of numerical variables; and/or an eligibility of the individual, or at least one family member and/or associate, for P&C insurance coverage by the insurance provider as one of the number of numerical variables or a yes/no determinant.

As described in the present disclosure, assigned LER scores based on the strength of the relationship can place individuals into tiers that dictate what level (e.g., amount) of premium the individuals will be charged. The tiers can reside within already existent medical underwriting classes, working cooperatively to assign a particular premium to a particular individual. Individuals who have a strong relationship with the insurance provider and/or the financial institution associated with the insurance provider (e.g., having a high LER score indicative of a low future lapse risk) will be assigned a discounted premium compared to individuals who have a weaker relationship (e.g., having a lower LER score indicative of a higher future lapse risk).

Benefits to individuals who have the strong relationship and who become life insurance policy holders include being rewarded for the behavior that contributed to the strong relationship (e.g., as reflected by the high LER score) by paying a discounted premium relative to a base rate for the medical underwriting class to which the individual has been assigned. Benefits to the insurance provider include being able to account for differing levels of risk (e.g., the risk of an individual letting the policy lapse in the future) in each medical underwriting class by charging accordingly.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the disclosed embodiments of the present disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for determining a premium for a life insurance policy comprising;
    determining, by one or more processors, at least one tenure of a relationship between an individual and an insurance provider;
    executing, by said one or more processors, an equation having a number of relationship variables, wherein the at least one tenure of a relationship between the individual and an insurance provider is at least one of the number of relationship variables;
    determining, by said one or more processors, a score for future lapse risk for an individual based on results of the executed equation;
    determining, by said one or more processors, a tier from among a plurality of tiers using the score for the future lapse risk for the individual, wherein each of the plurality of tiers defines particular premiums for each of a plurality of mortality risk categories; and
    determining, by said one or more processors, the premium for the life insurance policy based on the particular premiums defined for the determined tier and a determination of a mortality risk category.

2. The method of claim 1, wherein determining at least one tenure of the relationship between the individual and the insurance provider includes defining a relationship between the individual and a financial institution associated with the insurance provider.

3. The method of claim 2, wherein defining the relationship between the individual and the financial institution associated with the insurance provider includes using the individual's balance in one or more interest-bearing accounts at the financial institution as one of the number of relationship variables.

4. The method of claim 2, wherein defining the relationship between the individual and the insurance provider or the financial institution associated with the insurance provider includes using the individual's tenure in at least one insurance or financial relationship as one of the number of relationship variables.

5. The method of claim 2, wherein defining the relationship between the individual and the insurance provider and the financial institution associated with the insurance provider includes using a total of non-payment communications served to the individual as one of the number of relationship variables.

6. The method of claim 2, wherein defining the relationship between the individual and the insurance provider and the financial institution associated with the insurance provider includes using a determination of whether the individual or at least one family member or associate is eligible for property and casualty insurance coverage by the insurance provider as one of the number of relationship variables.

7. A system for determining a premium for a life insurance policy, comprising:
    one or more databases having information about an individual; and
    a computing device in communication with the one or more databases with a processor in the computing device to:
        determine at least one tenure of a relationship between an individual and an insurance provider or a financial institution associated with the insurance provider;
        execute an equation having a number of relationship variables, wherein the at least one tenure of a relationship between the individual and an insurance provider or a financial institution associated with the insurance provider is at least one of the number of relationship variables;

determine a score for future lapse risk for an individual based on results of the executed equation;

determine a tier from among a plurality of tiers using the score for the future lapse risk for the individual, wherein each of the plurality of tiers defines particular premiums for each of a plurality of mortality risk categories; and determine the premium for the life insurance policy based on the particular premiums defined for the determined tier and a determination of a mortality risk category.

8. The system of claim 7, wherein the one or more databases include:

a first database having information about the individual and the relationship with the insurance provider from which tenures of a number of insurance policies are determinable;

a second database having information about the individual and the relationship with the financial institution associated with the insurance provider from which a tenure of the relationship is determinable; and a third database having information about the individual from which the determination of the mortality risk is determinable.

9. The system of 8, wherein:

the information in the first database includes information about the individual's previous and continuing life insurance, health insurance, and property and casualty insurance policies and their associated premium payment histories.

10. The system of 8, wherein:

the information in the second database includes information about the individual's previous and continuing bank accounts and their associated payment histories.

11. The system of 10, wherein:

the information in the second database includes information about the individual's present interest-bearing accounts, including the individual and cumulative balances.

12. A non-transitory computer-readable medium having computer-readable instructions stored thereon to determine a premium for a life insurance policy, the computer-readable instructions being executable by a processor to:

determine at least one tenure of a relationship between an individual and an insurance provider or a financial institution associated with the insurance provider;

execute an equation having a number of relationship variables, wherein the at least one tenure of a relationship between the individual and an insurance provider or a financial institution associated with the insurance provider is at least one of the number of relationship variables;

determine a score for future lapse risk for an individual based on results of the executed equation;

determine a tier from among a plurality of tiers using the score for the future lapse risk for the individual, wherein each of the plurality of tiers defines particular premiums for each of a plurality of mortality risk categories; and determine the premium for the life insurance policy based on the particular premiums defined for the determined tier and a determination of a mortality risk category.

13. The medium of claim 12, wherein a longer tenure of the relationship contributes to a score indicative of a lower future lapse risk.

14. The medium of claim 13, wherein the score indicative of the lower future lapse risk determines a lower premium than a base premium in each of a plurality of mortality risk categories.

15. The medium of claim 14, wherein a larger balance in the one or more interest-bearing accounts and a lower total of the non-payment communications served each contributes to a score indicative of a lower future lapse risk and wherein a score resulting from use of the number of relationship variables indicative of the lower future lapse risk determines a lower premium than a base premium in each of a plurality of mortality risk categories.

16. The medium of claim 12, wherein the number of relationship variables includes the individual's balance in one or more interest-bearing accounts at the financial institution and a total of non-payment communications served to the individual by the insurance provider and the financial institution.

17. The medium of claim 12, wherein a determination of whether the individual or at least one family member or associate is eligible for property and casualty insurance coverage by the insurance provider is used as an eligibility requirement.

* * * * *